United States Patent Office 3,721,598
Patented Mar. 20, 1973

3,721,598
CONDITIONING OF THERMOPLASTIC COMPOSITIONS FOR BONDING
Stephen D. Marcey, Dayton, Ohio, assignor to The National Cash Register Company, Dayton, Ohio
No Drawing. Filed Feb. 24, 1971, Ser. No. 118,481
Int. Cl. B32b 31/14; B44d 1/092
U.S. Cl. 156—330
15 Claims

ABSTRACT OF THE DISCLOSURE

The bonding properties of polyamide or acetal thermoplastic compositions are improved by conditioning the thermoplastic composition prior to bonding. Conditioners such as isopropyl phenol or hexafluoroacetone sesquihydrate have been employed. Conventional epoxy adhesives then are employed to bond the conditioned thermoplastic composition to metallic and non-metallic materials.

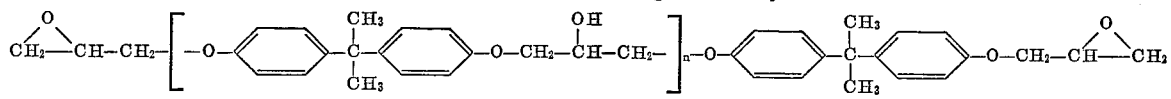

This invention relates to a process for improving the bonding properties of thermoplastic compositions. In another aspect, this invention relates to bonding thermoplastic to metallic and non-metallic materials.

It is well known that thermoplastic compositions usually are not satisfactorily respective to paints, adhesives, and the like. Generally, preliminary surface modification is required prior to the application of any commercially available adhesives. For example, U.S. Patent 3,462,335 discloses that polymers destined for bonding with an adhesive are bombarded with a stream of an excited inert gas. U.S. Patent 3,235,426 discloses a process for rendering polymers receptive to coatings with a chemical etching treatment. Various other chemical, mechanical, electrical or thermal pre-treatments are known in the art. However, these prior art processes often are not fully satisfactory. Frequently, these modifications are expensive, time consuming and technically complex. As a result, such processes are not commercially desirable.

It now has been found that the bonding properties of polyamide or acetal thermoplastic compositions are improved by conditioning the thermoplastic composition prior to bonding. Conditioners such as isopropyl phenol have been employed. If desired, the conditioning can be carried out at room temperature for periods of time as short as 10 minutes. Conventional epoxy adhesives then are employed to bond the conditioned thermoplastic compositions to metallic materials. The selection of specific conditioners improves the epoxy bond between the thermoplastic composition and the metallic or non-metallic material.

Accordingly, an object of this invention is to provide a process for improving the bonding properties of polyamide or acetal thermoplastic compositions.

Another object of this invention is to provide a process for bonding polyamide or acetal thermoplastic compositions to metallic and non-metallic materials.

Other objects, aspects and advantages of this invention will be apparent to one skilled in the art from the following disclosure and appended claims.

The conditioners that are employed in the processes of this invention are isopropyl phenol; 2,4-dimethyl phenol; hexafluoroacetone sesquihydrate; 1,2-dihydroxybenzene in butyl alcohol or 1,3-dihydroxybenzene in butyl alcohol. Generally, the dihydroxybenzene in alcohol mixtures comprise a 1:1 ratio by weight.

The epoxy adhesive that is employed in the processes of this invention is known in the art. Generally, the epoxy adhesive is a polyepoxide prepared by the reaction of polyhydric alcohols such as glycols, glycerine, trimethylol propane, polyhydric phenols and polyphenols with an excess of an epoxide such as epihalohydrins and alkylene oxides. Preferred polyepoxides are obtained by reacting bisphenol A and epichlorohydrin. This polyepoxide is represented by the formula:

wherein $n$ has an average value of 0 to 10. Generally, $n$ ranges from 0 to 3, preferably 0 to 1. Note, these polyepoxides are characterized as having at least two epoxy groups per molecule. These epoxy resins are further described in U.S. Patent 3,261,882.

Any metallic material can be employed in the processes of this invention. Any of the metals disclosed in the Periodic Table can be employed as well as combinations thereof. Preferably, aluminum, iron or steel is employed in the processes of this invention. The metals can be chrome plate if desired. Other substrates, which are non-metals, also can be employed. Specific examples include plastic, wood, glass, ceramics and the like.

Polyamides, which are the condensation polymers of dicarboxylic acids and diamines, are preferred thermoplastic compositions. Nylon 6/6 or the condensation polymer of hexamethylenediamine and adipic acid is most preferred. Other nylons that can be employed in the processes of this invention are disclosed in The Condensed Chemical Dictionary, edited by Arthur and Elizabeth Rose, Reinhold Book Corporation, seventh edition, at pages 683 and 684 (1966). Still other polyamides that can be employed in the processes of this invention are disclosed in U.S. Pats. 3,261,882 and 3,235,426. Acetal thermoplastic compositions such as polyoxymethylene are employed in this invention.

The conditioners can be applied to the thermoplastic compositions by various means. Dipping, brushing and spraying can be employed. Preferably, the thermoplastic compositions were dipped into the conditioner. The thermoplastic compositions then are dried. Preferably, the drying is carried out at ambient room temperature for about ten minutes.

The epoxy adhesive then is applied to the thermoplastic composition and pressed to the metallic material with sufficient force to bond the materials together. Generally, the force is a relatively light load, e.g., about 5 to 100 p.s.i., preferably about 5 to 50 p.s.i. The finished product then is cured at a temperature ranging up to 300 degrees Fahrenheit for a time ranging up to 24 hours. Preferably, the curing temperature ranges up to 250 degrees Fahrenheit and the curing time ranges up to 5 hours.

As will be demonstrated, the prior conditioning of the thermoplastic composition provides improved bonding to various substrates. One application of the processes of this invention is to bond nylon bobbins (coils) to metal arms in activator arm assemblies. Previously, such assemblies were unsatisfactory in that the adhesion properties of the bobbin surface were poor. Conditioning according to this invention now has provided desirable bonding between the spring-like bobbin and the metal arms.

The advantages of this invention are further illustrated by the following examples. The reactants and the proportions and other specific conditions are presented as being typical and should not be construed to limit the invention unduly.

EXAMPLE I

Various samples were prepared where nylon bobbins were adhered to metal arms. Some of the samples were merely bonded with conventional heat conductive epoxy resins. Other samples were conditioned with hexafluoroacetone sesquihydrate or a 1:1 mixture by weight of 1,3-dihydroxybenzene in butyl alcohol. The nylon pieces were dipped into the conditioner and then air dried at ambient room temperature for 10 minutes. The epoxy resin was applied to the nylon and then firmly pressed to the metal arm. The assemblies were cured at 230 degrees Fahrenheit

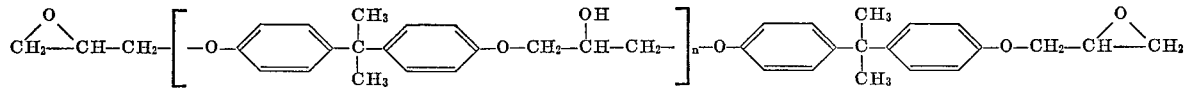

for 2 hours. When the conditioners were employed, bond strengths increased from a push-out force (coil pushed off core) of 15 to 20 pounds to as high as 600 pounds. This increase reflects the improved bond strength obtained by the use of conditioners.

EXAMPLE II

Other samples were prepared by bonding strips of nylon 6/6 to No. 302 stainless steel strips. The general procedure was the same as that described in Example I except that only 1,3-dihydroxybenzene in butyl alcohol (1:1 mixture by weight) was employed as the conditioner. Also, the adhesive in these samples was a 1:1 mixture of Epon 828 and Versamid 125. Epon 828, supplied by Shell Chemical Corporation, is a light colored, epichlorohydrin-bisphenol A, low molecular weight epoxy resin having the formula previously described. Versamid 125, supplied by General Mills, is a polyamide resin made by the condensation of dimerized vegetable oil acids and polyamino compounds. By bonding two stainless steel strips to each nylon strip, a double-lap tensile-shear test specimen was formed. After curing, the tensile test was performed. In the tensile test, the nylon broke and the bond held, thereby demonstrating the improved bond strength obtained by the use of conditioners.

Although this invention has been described in considerable detail, it must be understood that such detail is for the purposes of illustration only and that many variations and modifications can be made by one skilled in the art without departing from the scope and spirit thereof.

What is claimed is:

1. A process for improving the bonding properties of polyamide or polyoxymethylene thermoplastic compositions comprising the steps of:
   (a) applying a conditioner to the bonding surface of the thermoplastic composition wherein the conditioner is hexafluoroacetone sesquihydrate; and
   (b) drying the conditioned thermoplastic composition.

2. A process according to claim 1 wherein the applying is carried out by spraying, dipping or brushing and the drying is carried out at room temperature for about 10 minutes.

3. A process according to claim 1 wherein the thermoplastic compositions are polyamides.

4. A process according to claim 1 wherein the thermoplastic compositions are polyamides which are the condensation product of dicarboxylic acids and diamines.

5. A process according to claim 1 wherein the thermoplastic compositions are polyamides which are the condensation product of adipic acid and hexamethylene diamine.

6. A process for bonding polyamide or polyoxymethylene thermoplastic compositions to metallic or non-metallic materials comprising the steps of:
   (a) applying a conditioner to the bonding surface of the thermoplastic composition wherein the conditioner is hexafluoroacetone sesquihydrate;
   (b) drying the conditioned thermoplastic composition;
   (c) applying an epoxy adhesive comprising a polyepoxide having at least 2 epoxy groups per molecule to the bonding surface of the thermoplastic composition or to the bonding surface of the metallic or non-metallic material;
   (d) pressing the bonding surface of the thermoplastic composition to the bonding surface of the metallic or non-metallic material; and
   (e) curing the resulting bond.

7. A process according to claim 6 wherein the thermoplastic compositions are polyamides.

8. A process according to claim 6 wherein the thermoplastic compositions are polyamides which are the condensation product of dicarboxylic acids and diamines.

9. A process according to claim 6 wherein the thermoplastic compositions are polyamides which are the condensation product of adipic acid and hexamethylene diamine.

10. A process according to claim 6 wherein the metallic material is iron, steel or aluminum.

11. A process according to claim 6 wherein the polyepoxide is represented by the formula.

12. A process according to claim 6 wherein the epoxy adhesive is a 1:1 mixture by weight of (1) a condensation product of epichlorohydrin and bisphenol A and (2) a polyamide resin.

13. A process according to claim 6 wherein the applying of steps (a) and (c) is carried out by spraying, dipping or brushing, the drying of step (b) is carried out at ambient room temperature for about 10 minutes, the pressing of step (d) is carried out under a pressure of 5 to 100 p.s.i. and the curing of step (e) is carried out at temperatures ranging up to 300° F. for a time ranging up to 24 hours.

14. A process according to claim 6 wherein the pressing of step (d) is carried out under a pressure of 5 to 50 p.s.i. and the curing of step (e) is carried out at temperatures ranging up to 250° F. for a time ranging up to 5 hours.

15. A process according to claim 6 wherein the pressing of step (d) is carried out under light pressure and the curing of step (e) is carried out at a temperature of 230° F. for 2 hours.

(References on following page)

References Cited

UNITED STATES PATENTS

| | | | |
|---|---|---|---|
| 3,288,664 | 11/1966 | Hoppe | 156—310 |
| 2,970,077 | 1/1961 | Groves | 156—308 |
| 3,053,609 | 9/1962 | Miller | 156—307 X |
| 3,095,550 | 6/1963 | Kilduff et al. | 156—308 X |
| 3,248,271 | 4/1966 | Rielly et al. | 117—47 A |
| 3,296,054 | 1/1967 | McCann | 156—308 |
| 3,556,882 | 1/1971 | Fishman et al. | 117—47 A |

HAROLD ANSHER, Primary Examiner

U.S. Cl. X.R.

117—47 A, 63; 156—308, 310